United States Patent
Roy

(10) Patent No.: US 8,178,795 B2
(45) Date of Patent: May 15, 2012

(54) METHOD FOR RETROFITTING AIR PLENUM GROMMETS

(75) Inventor: Daniel Roy, Woodstock, CT (US)

(73) Assignee: Custom Plastic Distributors, Inc., Putnam, CT (US)

( * ) Notice: Subject to any disclaimer, the term of this patent is extended or adjusted under 35 U.S.C. 154(b) by 425 days.

(21) Appl. No.: 12/455,730

(22) Filed: Jun. 5, 2009

(65) Prior Publication Data
US 2010/0307817 A1    Dec. 9, 2010

(51) Int. Cl.
*H02G 3/18* (2006.01)

(52) U.S. Cl. ............. 174/666; 174/50; 174/58; 174/60; 174/61; 174/68.1; 174/68.3; 174/151; 174/152 G; 174/153 G; 174/480; 174/482; 174/650; 220/3.2

(58) Field of Classification Search .............. 174/50, 174/482, 650, 666, 480, 481, 68.1, 68.3, 174/58, 60, 61, 152 G, 153 G, 151; 220/3.2–3.9, 220/3.92, 3.94
See application file for complete search history.

(56) References Cited

U.S. PATENT DOCUMENTS

| | | | | |
|---|---|---|---|---|
| 4,027,094 A | * | 5/1977 | Philips | 174/485 |
| 4,244,484 A | * | 1/1981 | Guritz et al. | 220/3.7 |
| 4,259,542 A | * | 3/1981 | Tehan et al. | 174/483 |
| 4,273,404 A | * | 6/1981 | Hedlund et al. | 439/384 |
| 4,770,643 A | * | 9/1988 | Castellani et al. | 439/135 |
| 4,827,080 A | * | 5/1989 | Castellani et al. | 174/487 |
| 5,049,702 A | * | 9/1991 | Hadfield | 174/487 |
| 5,235,134 A | * | 8/1993 | Jaycox | 174/87 |
| 6,632,999 B2 | | 10/2003 | Sempliner et al. | 174/65 |
| 6,995,317 B1 | | 2/2006 | Dzurilla | 174/65 |
| 7,141,744 B2 | * | 11/2006 | Cloutier | 174/650 |
| D538,136 S | | 3/2007 | Barden et al. | D8/356 |
| D571,641 S | | 6/2008 | Sempliner et al. | D8/356 |
| 2007/0022668 A1 | * | 2/2007 | Kasten et al. | 52/3 |
| 2010/0307817 A1 | * | 12/2010 | Roy | 174/666 |

* cited by examiner

Primary Examiner — John K Kim
(74) Attorney, Agent, or Firm — Michaud-Kinney Group LLP

(57) ABSTRACT

A new and improved method is provided for repairing or retrofitting cable management apparatus used in raised flooring systems constructed to deliver a source of building air, or HVAC, while managing cables passing through an access port constructed in the raised flooring structure without jeopardizing the underfloor plenum air delivery systems. A raised floor grommet assembly provides a grommet locking mechanism defining an assembly retention system that lockingly engages and removeably disengages a first section and a second section of the grommet assembly, and an access port locking mechanism that lockingly engages and removeably disengages an access port constructed in the raised flooring structure. The unique grommet assembly provides an efficient and effective method and apparatus designed for retrofitting cable management systems and accommodates system upgrades, workstation relocation, and HVAC management.

4 Claims, 7 Drawing Sheets

METHOD FOR RETROFITTING AIR PLENUM GROMMETS

FIELD OF THE INVENTION

The present invention relates to a new and improved method for retrofitting cable management systems and repairing or replacing outdated cable management apparatus used in building platform technology. A raised flooring system is typically constructed to deliver a source of building air such as heat, ventilation, and air conditioning ("HVAC"). In particular, the present invention comprises a method and an apparatus designed for managing, as a retrofit or repair operation, the cables passing through an access port constructed in the raised flooring structure without jeopardizing the underfloor plenum air delivery systems.

BACKGROUND OF THE INVENTION

Brief Description of the Related Art

With the continued development of information technology systems, there is a need to support a wide variety of workspaces designed for maximum connectivity flexibility. Connectivity locations often are required in highly visible office environments and must support, with minimal restrictions, the placement of work stations, office equipment, and other data management systems. Typically, the office building structures that support these facilities are built upon raised flooring systems that provide a means for delivering HVAC as well as data and power cables for computer and telecommunications usage.

HVAC are supplied under the raised floor and directed through air diffusers located throughout the floor system. The raised flooring system defines a plurality of openings in order to allow for the passage of the requisite flow of air through the raised floor. Typically, these passages are protected by louvered inserts, or vents, that permit the passage of air therethrough while attempting to minimize the amount of debris that falls back through the vent.

Another key feature in raised flooring systems is the management of data and power cables for computer and telecommunications usage. Again, the raised flooring system defines a plurality of openings in order to allow for the passage of such cables and wires therethrough. It should be noted that the locations for the passage of HVAC through a raised floor are typically not in similar locations that would be required for the passage of cables and wires. This is due to a number of factors well known in the art such as the differences in designing a system for maximizing the flow efficiency of a HVAC system versus designing a system for maximizing the flexibility for the connectivity of workstations. Accordingly, within the apertures created in the raised floor structure for the passage of cables and wires therethrough, there exists a need to provide for such passage while minimizing the passage of HVAC and debris. Moreover, since these apertures may be located near workstations, they need to be safe as well as aesthetically pleasing.

Floor grommets have been designed for placement within the apertures of raised flooring systems to accommodate the passing of cables therethrough while minimizing the passage of HVAC and debris. Such grommets prevent the passage of HVAC to locations where such leakage would be problematic; such as, for example, providing a flow of heated air proximate to a stack of network servers. Correspondingly, use of the cable floor grommets also optimizes the flow of HVAC according to the original design of the HVAC system. There are a number of floor grommets known in the prior art particularly designed for initial installation of the raised flooring system within the original cable openings of the raised floor.

The specialized floor grommet disclosed in U.S. Pat. No. 6,632,999 to Sempliner, et al. ("the '999 Patent"), provides a surrounding frame mounting sealing element with thin flexible elements which are anchored at one end in the grommet frame and extend toward the center of the opening from each side. The '999 Patent discloses installing a frame within the raised floor, into a cutout designed to accept such frame, and where such frame includes brush-like filaments extending from one side of the frame to the middle of the device. Cables pass through the brush-like elements and these flexible elements are supposed to close the opening in the floor surrounding the cables passing therethrough. The '999 Patent relies upon minimal deflection of the flexible elements to limit the escape of HVAC.

U.S. Pat. No. 7,141,744 to Cloutier discloses a wire grommet intended to be positioned in a hole made into a surface of a panel or plate. The grommet is made of two identical elements that form a container when assembled. Each element defines a corresponding tongue and groove to provide for the assembly and disassembly of the unit. The assembled unit, the container, defines one or more apertures in the container wall through which a cable may pass. This prior art describes the use of this device for providing cabling access to a piece of furniture such as a desktop, bookcase or shelf. It does not address the need for minimizing the flow of HVAC through the grommet.

The prior art grommets described above and others known in the art do not provide for an economical and efficient method for retrofitting a raised flooring system grommet for cable and air flow management. Current cable management systems must be able to readily accommodate system upgrades, workstation relocation, as well as provide for cable management and HVAC management. Accordingly, it is an object of the present invention to provide a method and an apparatus designed for retrofitting cable management systems and repairing or replacing outdated cable management apparatus used in raised flooring systems. It is another object of the present invention to accommodate system upgrades, workstation relocation, as well as to provide for cable management and HVAC management. It is yet another object of the present invention to provide a method and an apparatus for managing, as a retrofit or repair operation, the cables passing through an access port constructed in the raised flooring structure without jeopardizing the underfloor plenum air delivery systems.

DESCRIPTION OF THE INVENTION

Specialized floor grommets are installed in the openings of raised flooring structures and are comprised of a cable-surrounding floor-sealing element. Typically, certain office building structures comprise raised flooring systems that define apertures for the passage of cables and wires therethrough. These cables typically comprise data and power cables for computer and telecommunications usage, and are found in special areas within the building structure. The present invention comprises a method and an apparatus designed for retrofitting cable management systems and repairing or replacing outdated cable management apparatus used in building platform technology where an access floor system is used to deliver a source of building air, such as HVAC, or simply the passage of the cables through a raised flooring structure.

Typically, HVAC is supplied under the raised floor and directed through air diffusers located throughout the raised flooring system. One of the problems encountered in attempting to maximize the efficiency of an HVAC design is air leakage in areas other than those designated for air diffusers. Traditionally, an aperture was provided through the raised floor for passage of power and data cables. These apertures were treated with some sort of trim or grommet which offered protection between the cut edge of the panel or floor tile and the cables passing through. Moreover, these apertures are often numerous and air leakage through them causes an imbalance in the air delivery system.

Computers and other high density office equipment for telecommunications, internet access, data storage and the like are located in dedicated areas of these buildings. A preferred method for accommodating HVAC and cable management in these areas is to provide a raised flooring structure comprised of individual floor tiles supported by a flooring structure framework. This provides a suitable plenum space underneath the floor for the passage of HVAC and for data and power cables. Apertures are provided in the floor tiles to allow for the passage of these cables and wires from underneath the floor upward to a certain connection point within the room or directly to a workstation. In some rooms, there can be multiple cable openings in the floor.

The present invention comprises a split gasket seal grommet that is positioned within an aperture in the access floor panel. The novel split gasket seal grommet removes the need for an outer housing ring and facilitates quick and easy installation of the grommet. A preferred embodiment of the present invention provides a flame-retardant gasket that defines a plurality of optional cable knockouts. The unit is designed as a high load performance grommet and the gasket provides an excellent air seal around cables. Moreover, a retained center cover forms a solid lid for the unit when no cables are passing through the grommet.

A grommet according to the present invention provides for: i) reduced air-loss and increased static pressure for underfloor air installations; (ii) improved cooling efficiencies and extended cooling equipment life; (iii) reduced cooling plant running costs; (iv) sealing of cable openings to prevent underfloor contamination; and (v) flexible floor panel cutout installation placement options. A preferred embodiment of the present invention is fabricated from a high strength flame retardant Acrylonitrile-Butadiene-Styrene ("ABS") wherein the unit is inherently anti-static. In addition, the unit comprises a quick spring clamp design and includes corresponding body-matching cover plug inserts for aesthetic purposes.

DETAILED DESCRIPTION OF THE INVENTION

Figure 1:
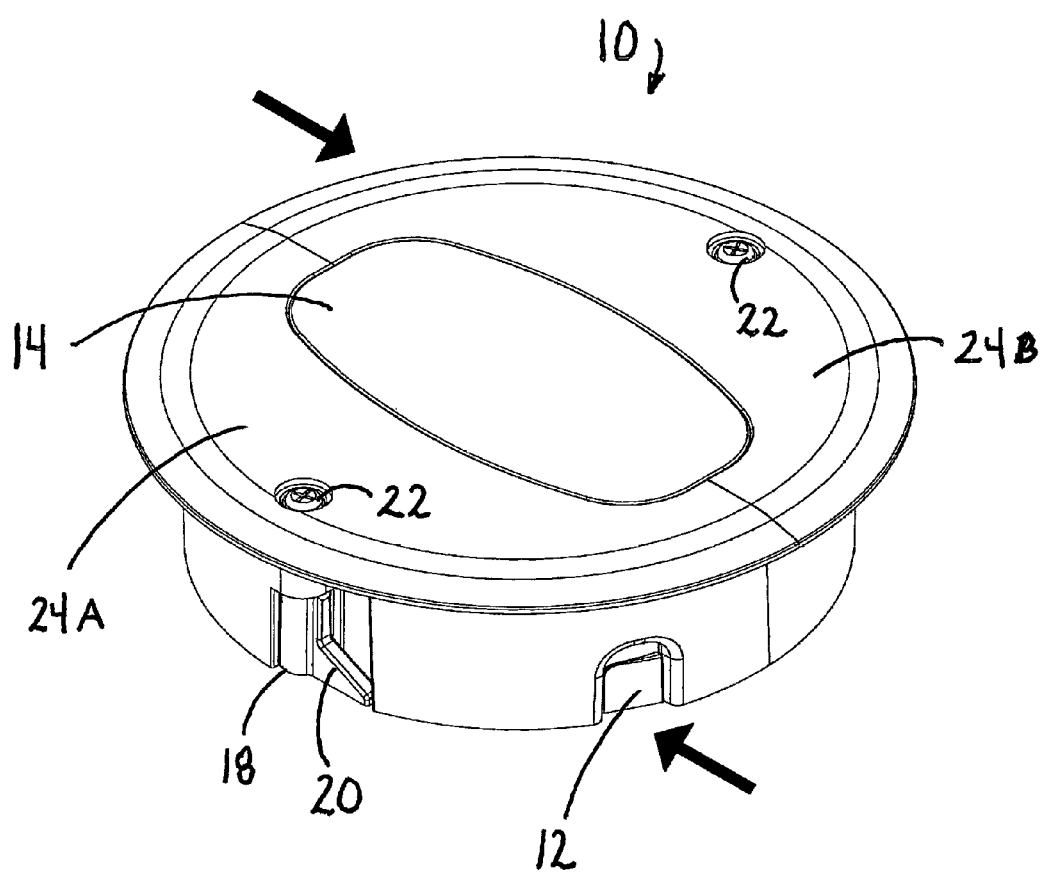
FIG. 1 provides an isometric view of a preferred embodiment of the present invention in a fully-assembled condition.

A preferred embodiment of the present invention is illustrated in FIG. 1. Grommet (10) is shown together with assembly retention system release (12) and top protective cover plate (14). Cover (14) is designed such that it can remain in place and provide an essentially flat or level surface if no cables are to be passed through grommet (10).

Figure 2:
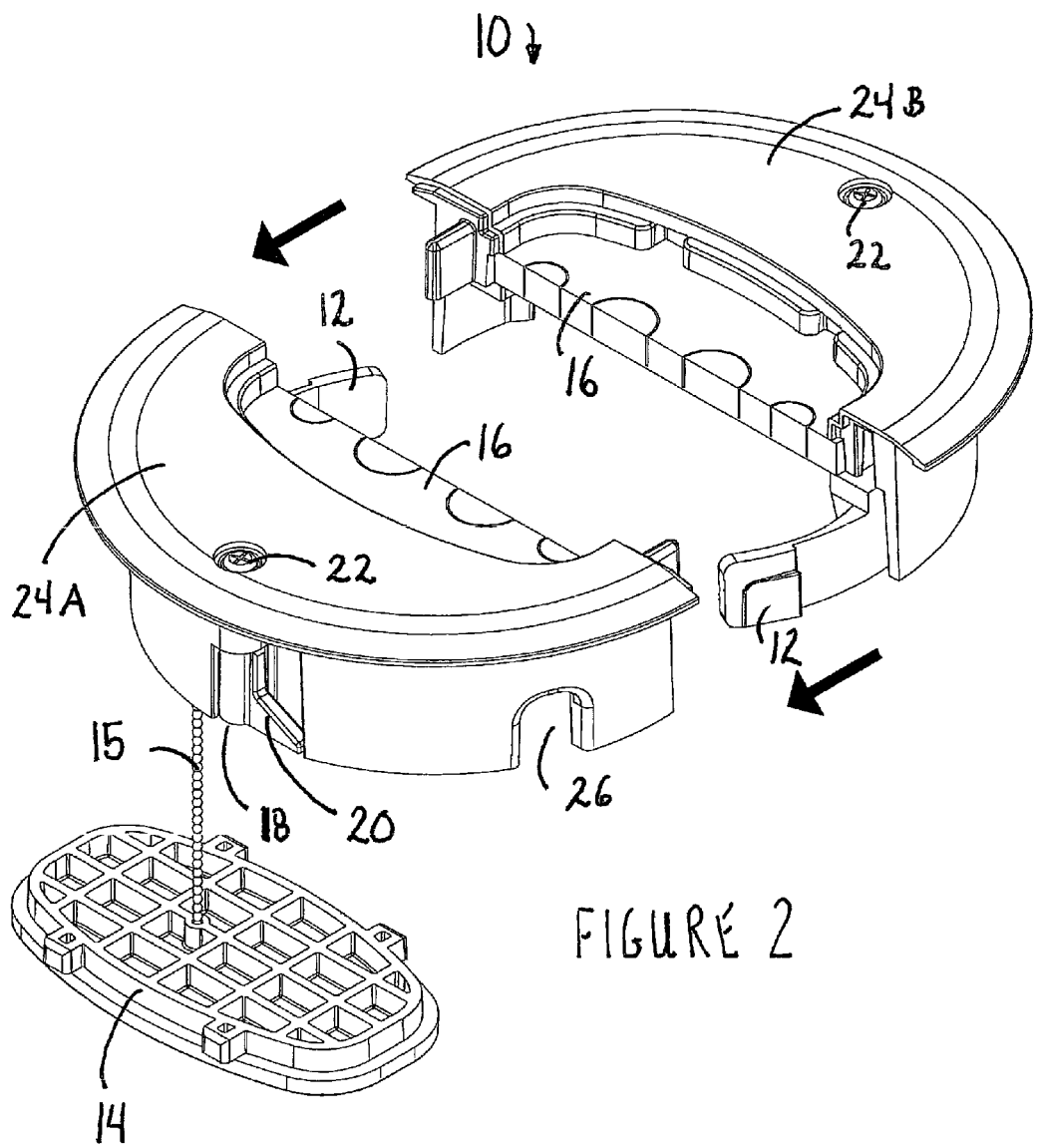
FIG. 2 provides an isometric view of the embodiment shown in FIG. 1 in a disassembled condition.

FIG. 2 shows grommet (10) with top protective cover (14) removed. Protective cover (14) remains tethered to grommet (10) via a suitable means such as a chain (15). Cable seal (16) substrate is mounted within grommet (10) and permits cables to pass through grommet (10) and still substantially limit HVAC or air from passing through. One preferred embodiment of cable seal (16) substrate is fabricated from the elastomer ethylene propylene diene monomer rubber (EPDM rubber). Any conventional foam or suitably pliable material also may be used.

As further shown in FIGS. 1 and 2, a method for locking grommet (10) into a floor panel is provided. Grommet locking mechanism (18) comprises two mechanical toggles (20) activated from a screw or other similar means (22) on the top of the grommet (10). Initially, grommet (10) is divided by pressing assembly retention system releases (12) inward toward the center of grommet (10) as indicated by the arrows in FIG. 1. Next, a first section (24A) is separated from a second section (24B), together with its respective cable seal (16), as indicated by the arrows in FIG. 2. When rejoined, the respective halves will engage and "click" into place.

In one embodiment of the present invention, the inner diameter of first section (24A) defines, on one side, an assembly retention system release (12) that engages aperture (26) defined in second section (24B) (not shown in FIG. 2). Similarly, first section (24A) defines, on an opposite side, aperture (26) designed to engage and receive assembly retention system release (12) defined in second section (24B). When first section (24A) and second section (24B) are pressed together such that the respective assembly retention system releases (12) engage apertures (26) and click into place, grommet (10) is securely, yet removeably, locked closed. There are many known methods for removeably securing first section (24A) to second section (24B), such as for example, defining at least one tab or at least one receiving aperture in either the first section or the second section such that at least one tab engages at least one aperture. Another known method for removeably securing first section (24A) to second section (24B) includes the use of male/female pin combinations, solvent welding, standard fasteners, etc., each of which is considered within the scope of this invention.

Figure 3:
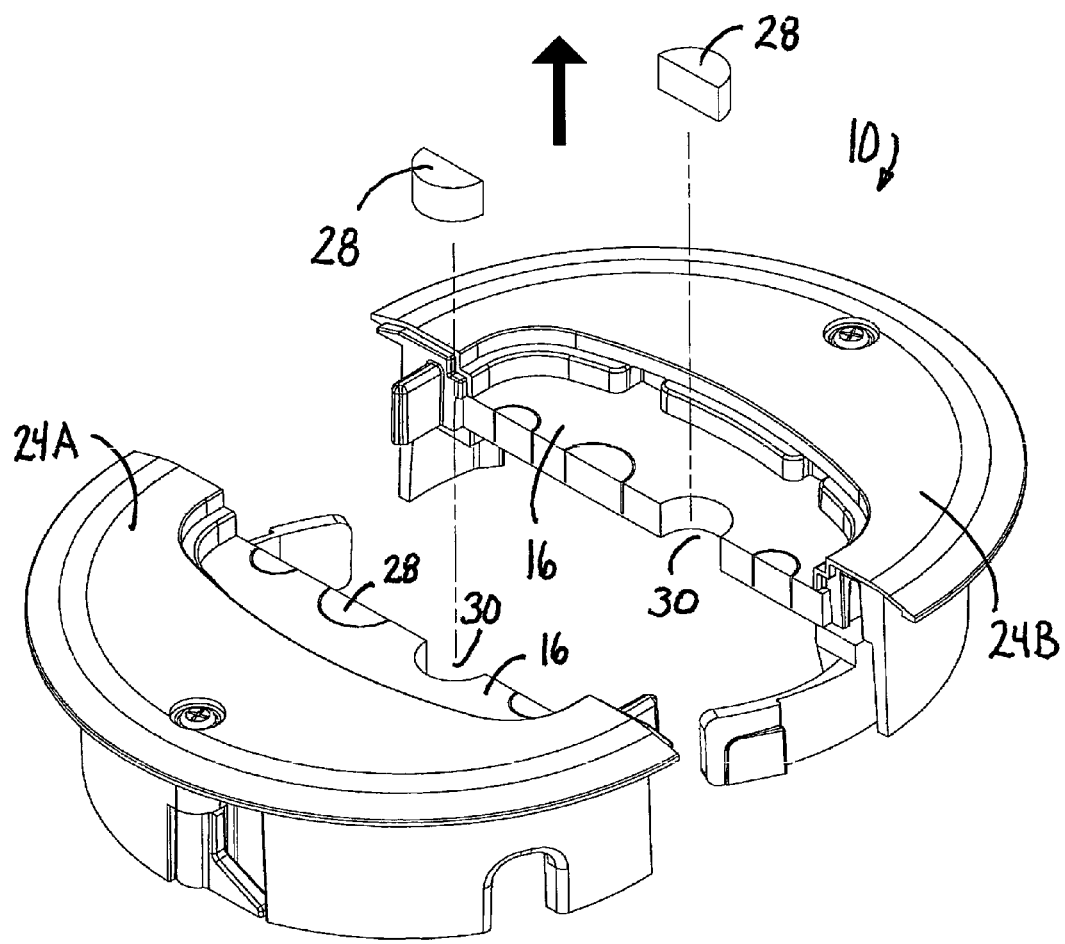
FIG. 3 provides an isometric view of the embodiment shown in FIG. 1 while preparing the device for cable management.
Figure 4:
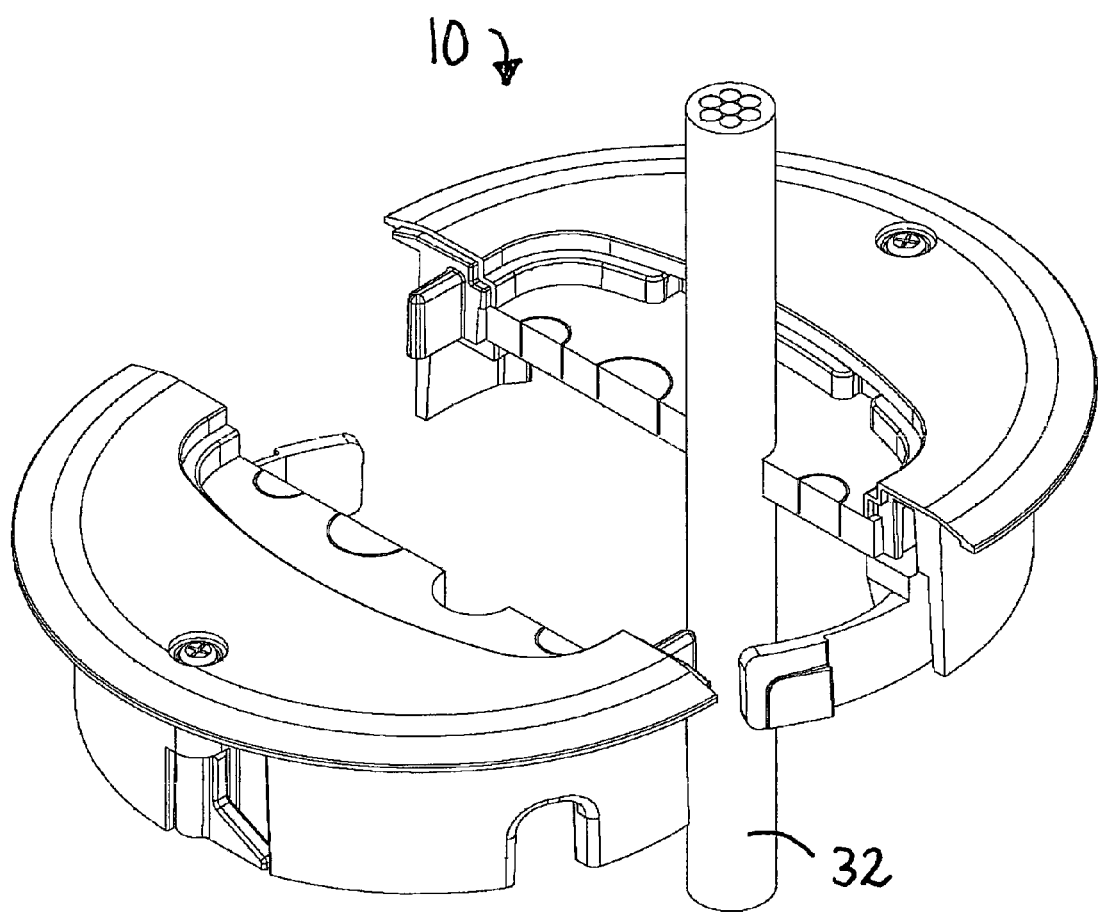
FIG. 4 provides an isometric view of the embodiment shown in FIG. 1 accepting a cable through its sealing element.

As shown in FIG. 3, knockouts (28) are provided, or prefabricated, within cable seal (16). Knockouts (28) are designed to be easily removed by pressing upward as indicated by the arrows in FIG. 3. Knockouts (28) are provided in a variety of sizes to accommodate cables and wires defining a variety of diameters. After removal of a corresponding pair of knockouts (28), corresponding apertures (30) are defined in cable seal (16) to permit cable (32) to pass therethrough while maintaining a tight air seal as shown in FIG. 4.

Figure 5:
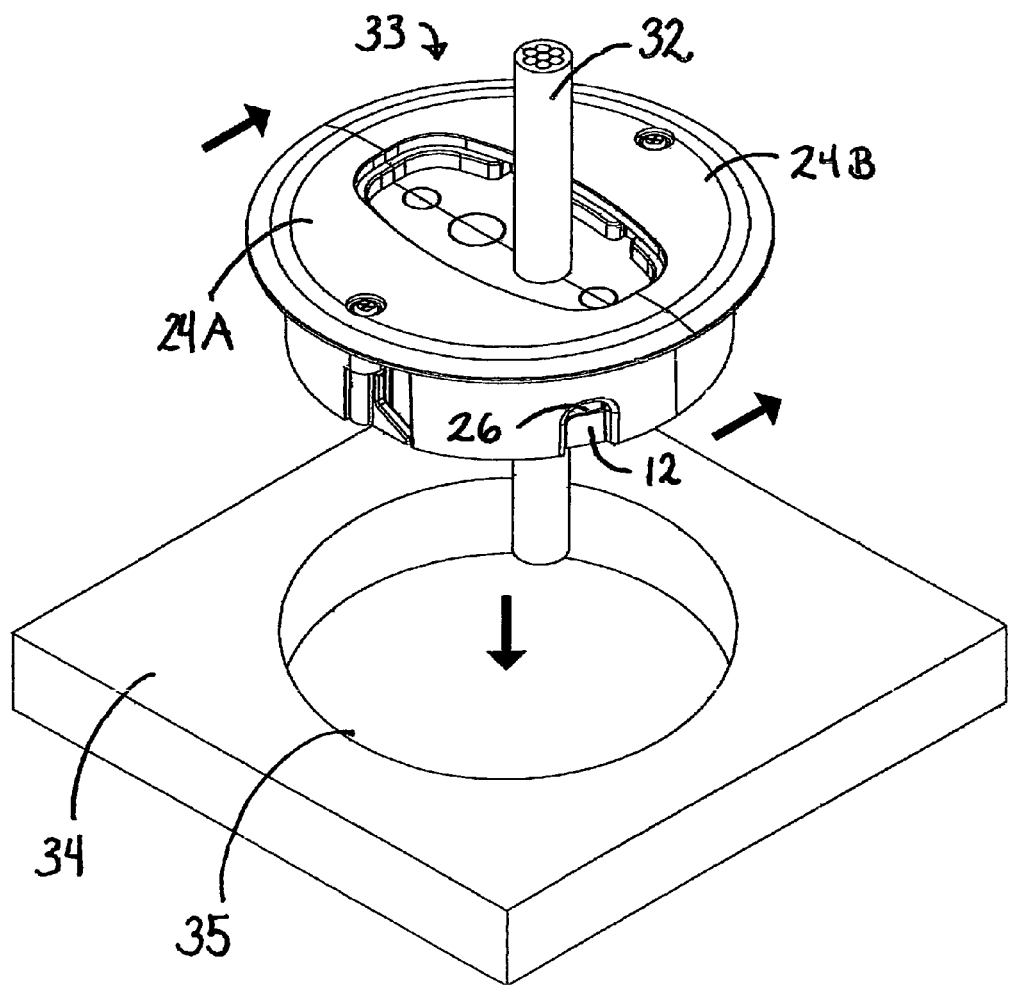
FIG. 5 provides an isometric view of a method of installing the embodiment shown in FIG. 1.

As described above and as shown in FIG. 5, first section (24A) and second section (24B) are pressed together, as indicated by the arrows in FIG. 5, such that the respective assembly retention system releases (12) engage apertures (26) and click into place, and grommet (10) is locked closed. The grommet assembly (33) is then positioned within a raised floor structure floor (34). The present invention permits the installation, repair, or retrofit of floor grommets in an easy and economical manner requiring only the cutout of an access port in a floor tile to accommodate the grommet without having to remove or replace a floor tile itself.

Figure 6:
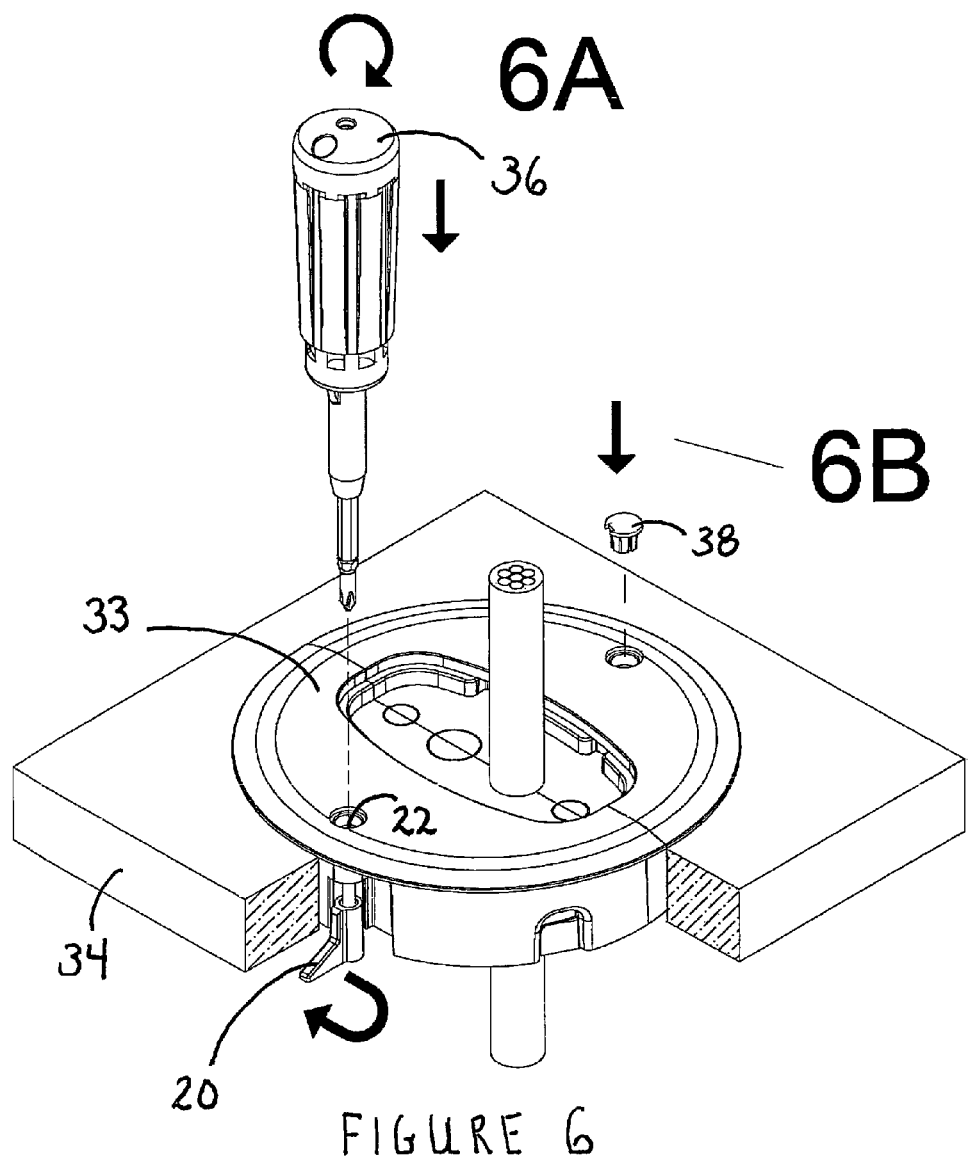
FIG. 6 provides an isometric view of a method of securing the embodiment shown in FIG. 1 to a raised flooring structure floor panel.

As shown in FIG. 6, grommet assembly (33) is positioned within raised flooring structure floor panel (34). An access port locking mechanism comprises mechanical toggles (20) that are activated upon by mechanically driven means, such as, for example, screws (22) in communication with the mechanical toggles (20) as shown by mechanical means (36), a screwdriver, activated as indicated by the arrows labeled 6A in FIG. 6. For aesthetic purposes, a preferred embodiment of the invention includes corresponding grommet body-matching screw cover plug inserts (38) placed over screws (22) as indicated by the arrows labeled 6B in FIG. 6. Accordingly, the unit comprises a quick spring clamp design that can easily be secured into raised flooring structure floor panel (34) and removed as easily when necessary.

The grommet assembly according to the present invention was tested in a number of experiments to determine its effectiveness with regard to underfloor static pressure in relation to cubic feet per minute ("CFM") of air passing through the grommet assembly under various cabling configurations. The results are tabulated below:

TABLE 1

CFM as a Function of Cabling Configuration

| Static Pressure (in. $H_2O$) | no cable, no holes open | 3/4" tubing in one opening | 3/4" hole open | 3/8" tubing in one opening | 3/8" hole open |
|---|---|---|---|---|---|
| 0.1 | 0.9 | 1.4 | 4.2 | 0.8 | 1.9 |
| 0.2 | 1.3 | 1.9 | 5.9 | 1.1 | 2.8 |
| 0.3 | 1.5 | 2.2 | 6.9 | 1.3 | 3.5 |
| 0.4 | 1.6 | 2.3 | 7.7 | 1.5 | 4.2 |
| 0.5 | 1.6 | 2.3 | 8.4 | 1.7 | 4.7 |

CFM

Figure 7:
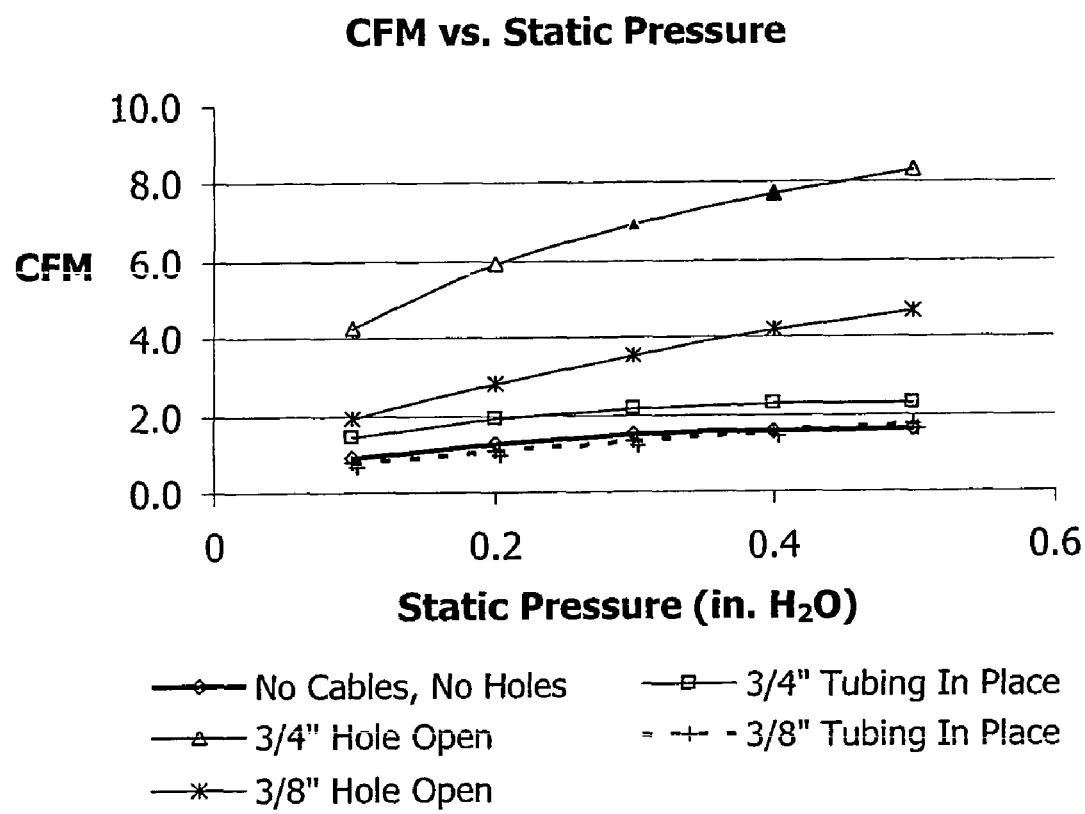
FIG. 7 provides in graphical form underfloor static pressure in relation to cubic feet per minute ("CFM") of air passing through a grommet assembly according to the present invention under various cabling configurations.

With no cables passing through the grommet assembly, the grommet assembly maintained an acceptable CFM at static pressure to 0.5 in. $H_2O$. The table also presents results showing the CFM rate for a grommet assembly with a cable passing through an opening in the cable seal and the same assembly with that hole in the cable seal open. The results indicate the effectiveness of the grommet seal at maintaining a substantially air tight seal while permitting cables to pass therethrough. The results are presented graphically in FIG. 7.

Although the invention has been described in considerable detail with respect to the advantages of a raised flooring grommet assembly according to the present invention, it will be apparent that the invention is capable of numerous modifications and variations, apparent to those skilled in the art, without departing from the spirit and scope of the invention. For example, a grommet assembly according to the present invention comprising a grommet locking mechanism including an assembly retention system that lockingly engages and removeably disengages a first section and a second section, and an access port locking mechanism that lockingly engages and removeably disengages an access port constructed in a raised flooring structure, need not define a circular configuration but may define any one of a number of geometric configurations. The present invention provides an efficient and effective method and apparatus designed for retrofitting cable management systems and repairing or replacing outdated cable management apparatus used in raised flooring systems. It accommodates system upgrades, workstation relocation, cable management and HVAC management.

The invention claimed is:

1. A method for managing cables passing through an access port constructed in a raised flooring structure floor panel comprising:
    a) providing a substantially round floor grommet assembly wherein a grommet defines a first section and a second section;
    b) providing a grommet locking mechanism comprised of an assembly retention system that lockingly engages and removeably disengages the first section and the second section;
    c) providing a cable sealing substrate mounted within the first section and the second section;
    d) providing preformed knockouts within the cable sealing substrate;
    e) positioning the grommet assembly within the access port constructed in a raised flooring structure;
    (f) providing an access port locking mechanism that lockingly engages and removeably disengages the access port; and
    g) providing a cover plate placed over the cable sealing substrate wherein the cover plate remains tethered to the grommet assembly.

2. A method for managing cables passing through an access port constructed in a raised flooring structure floor panel comprising:
    a) providing a substantially round floor grommet assembly wherein a grommet defines a first section and a second section;
    providing a grommet locking mechanism comprised of an assembly retention system that (i) lockingly engages and removeably disengages the first section and the second section, and (ii) defines corresponding protrusions and receptacles in the first section and the second section whereby the protrusions and receptacles of the first section lockingly engage and removeably disengage the protrusions and receptacles of the second section;
    c) providing a cable sealing substrate mounted within the first section and the second section;
    d) providing preformed knockouts within the cable sealing substrate;
    e) positioning the grommet assembly within the access port constructed in a raised flooring structure;
    f) providing an access port locking mechanism that lockingly engages and removeably disengages the access port;
    g) providing at least one mechanical toggle; and
    h) mechanically activating the mechanical toggle to lockingly engage and removeably disengage the access port.

3. The method of claim 2 wherein the step of mechanically activating the mechanical toggle further comprises:
    a) providing an access aperture to the mechanical toggle; and
    b) activating a screwdriver through the access aperture thereby activating a screw in communication with the mechanical toggle to lockingly engage and removeably disengage the access port.

4. The method of claim 3 further comprising providing a plug to fill the access aperture to the mechanical toggle.

* * * * *